United States Patent
Sugiyama et al.

(10) Patent No.: US 6,842,292 B1
(45) Date of Patent: Jan. 11, 2005

(54) DISPLAY APPARATUS FOR VEHICLE

(75) Inventors: Tetsuya Sugiyama, Shizuoka (JP); Yoshiyuki Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/653,232

(22) Filed: Sep. 3, 2003

(30) Foreign Application Priority Data

Sep. 5, 2002 (JP) ........................................ 2002-259827

(51) Int. Cl.[7] .............................................. G02B 27/14
(52) U.S. Cl. ........................ 359/630; 359/242; 359/267; 359/629
(58) Field of Search .................................. 359/630, 629, 359/242, 267, 237, 618, 276

(56) References Cited

U.S. PATENT DOCUMENTS 6,100,943 A * 8/2000 Koide et al. .................. 349/11

* cited by examiner

Primary Examiner—Hung Xuan Dang
(74) Attorney, Agent, or Firm—Armstrong, Kratz, Quintos, Hanson & Brooks, LLP

(57) ABSTRACT

The light emitted from a warning display unit 16 is passed through a front glass 18 formed at the opening of a dash board 17 and a semi-permeable combiner 12 having a first polarizing plate 12b in this order so that it is guided to a driver's view point I. A second polarizing plate having the same polarizing direction as that of the first polarizing plate 12b is formed on the surface of the front glass 18. In this configuration, the wash-out in the warning display unit, i.e. a light emitting source, arranged behind a combiner can be prevented and visual recognition of the light emitting source can be improved.

2 Claims, 2 Drawing Sheets

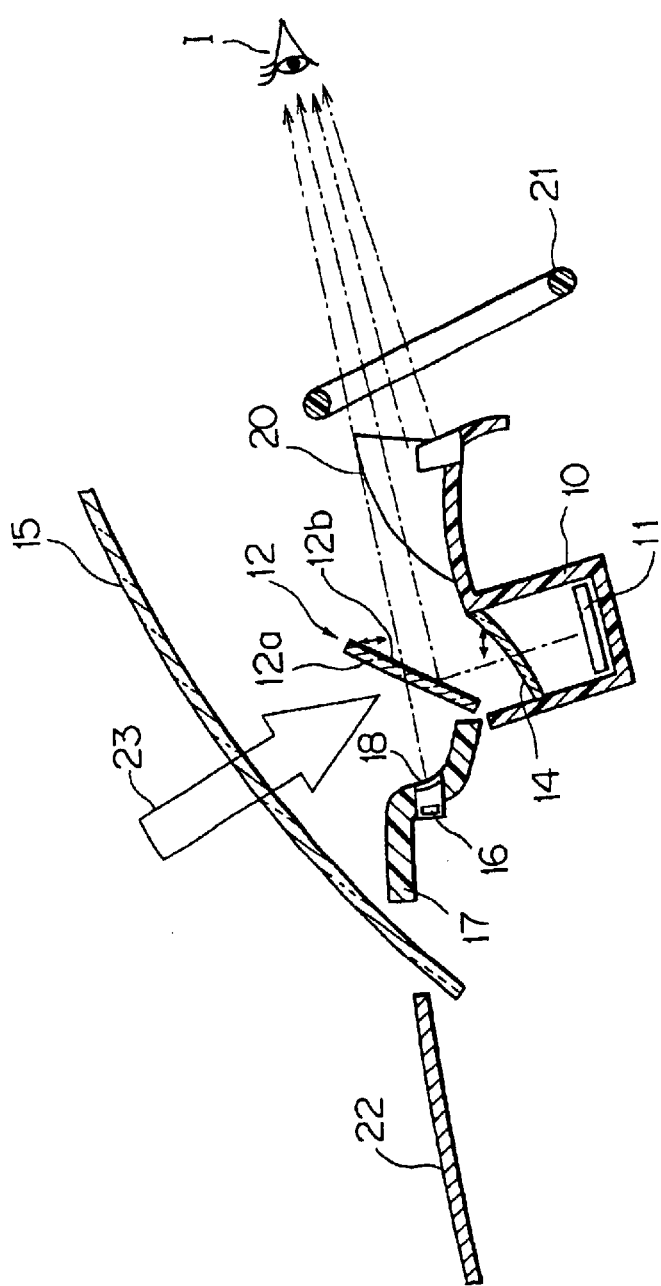
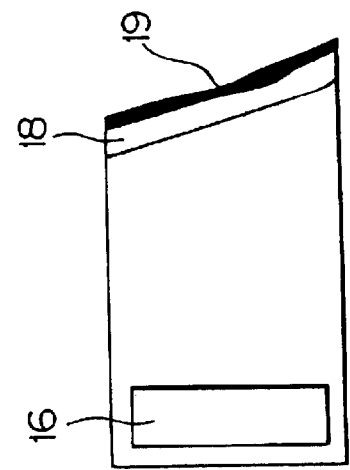
FIG. 1
FIG. 2

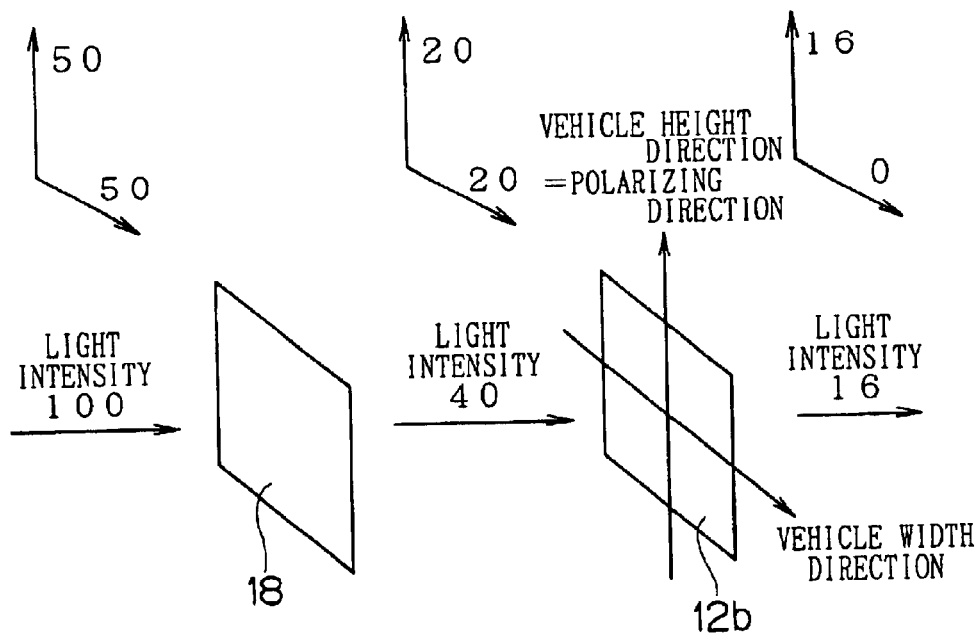
F I G. 3A
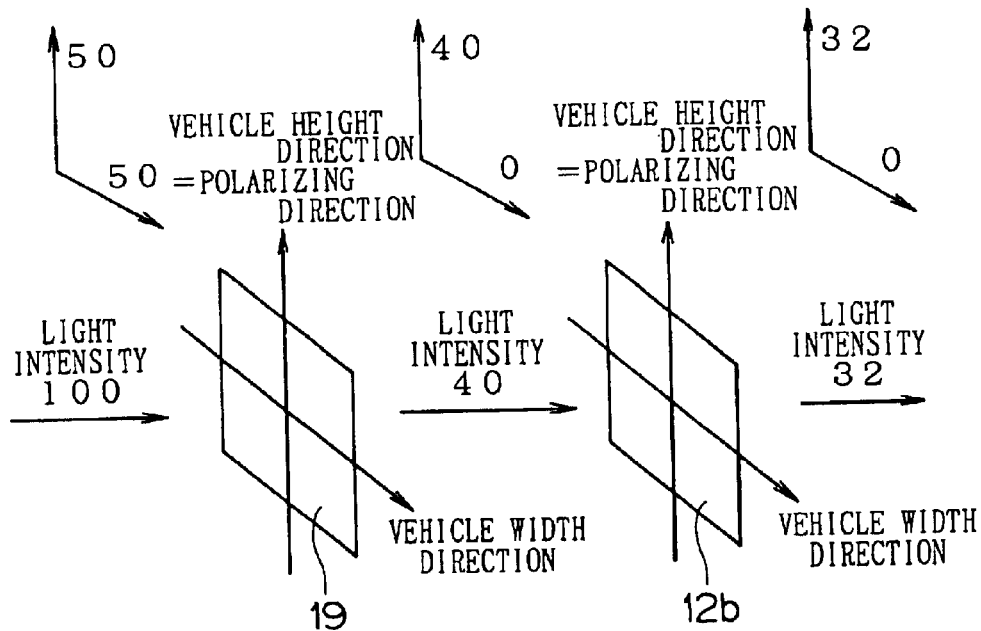
F I G. 3B

DISPLAY APPARATUS FOR VEHICLE

BACKGROUND OF THE INVENTION

1. Field of the Invention

This invention relates to a display apparatus for a vehicle, and more particularly to a display apparatus for a vehicle for passing light from a light emitting source through a front glass provided at an opening of a dash board incorporating the light emitting source and a semi-permeable combiner having a polarizing plate in this order, thereby guiding the light to a view point of a driver (driver's view point).

2. Description of the Related Art

There is a previously known display apparatus for a vehicle, in which, in order to display a displaying image as a virtual image at a long distance in front of a vehicle, as seen from FIG. 1, a display device 11 for information display with the display surface oriented above is arranged in e.g. a dash board, and the light emitted from the display device 11 is reflected from the semi-permeable combiner 12 so that it is guided to the driver's view point, thereby visually recognizing the virtual image of the display device 11 behind the semi-permeable combiner 12, i.e. in front of the vehicle.

In the display apparatus for a vehicle described above, however, the semi-permeable combiner 12 includes a semi-permeable resin 12a and a polarizing plate 12b. Between the semi-permeable combiner 12 and the display device 11, another polarizing plate 14 is arranged which has a polarizing direction perpendicular to that of the polarizing plate 12b.

By arranging the polarizing plates 12b and 14 in this manner, external light such as sunlight does not reach the display device 11, thereby preventing the display device 11 from "washing out" owing to the external light. In addition, the light emitted from the display device 11 does not reach a windshield 15, thereby preventing the display device from being reflected oh the window shield 15.

In the display apparatus for a vehicle described above, a previously known typical warning display unit 16 is further arranged behind the semi-permeable combiner 12. This warning display unit 16 serves to light a symbol mark with no design. The light emitted by the warning display unit 16 is guided to the view point of the driver (driver's view point) through the semi-permeable combiner 12.

A front glass 18 is arranged at an opening of the dash board 17 which incorporates the warning display unit 16. The front glass 18 is subjected to semi-permeable processing by e.g. smoking (coating of a smoke film) in order to prevent the external light from reaching the display device 11 so that the display device 11 is washed out.

As described above, the front glass 18 is subjected to the permeable processing to prevent the wash-out of the warning display unit 16. However, the light emitted from the warning display unit 16 must permeate two semi-permeable members of the front glass 18 and combiner 12 to reach the driver's view point. This makes it difficult to assure the luminance.

In order that the light emitted from the warning display unit 16 can be surely recognized, the luminance of the warning display unit 16 can be set at a high value. This is however problematic in cost.

SUMMARY OF THE INVENTION

In order to solve the problems described above, an object of this invention is to provide a display apparatus for a vehicle which can prevent the wash-out of a warning display unit located behind a combiner, i.e. light-emitting display source, and improve the visibility of the light-emitting source.

In order to attain the above object, there is provided a display apparatus for a vehicle comprising:

a light emitting source for emitting light;

a dash board which incorporates the light emitting source;

a front glass formed at an opening of the dash board;

a semi-permeable combiner having a first polarizing plate, the light emitted from the light emitting source being guided to a view point of a driver through the front glass and the first polarizing plate; and a second polarizing plate formed on a surface of the front glass and having the same polarizing direction as that of the first polarizing plate.

In accordance with the invention, the second polarizing plate having the same polarizing direction as that of the first polarizing plate which constitutes the semi-permeable combiner is formed on the surface of the front glass. Therefore, the amount of light emitted from the light-emitting source and guided to the driver's view point can be increased as compared with the case where the front glass subjected to smoking is given to have the permeability equal to that of the front glass provided with the second polarizing plate.

The above and other objects and features of the invention will be more apparent from the following description taken in conjunction with the accompanying drawings.

BRIEF DESCRIPTION OF THE DRAWINGS

FIG. 1 is a view showing an embodiment of the display apparatus for a vehicle according to this invention;

FIG. 2 is an enlarged view of the neighborhood of the warning display unit 16 shown in FIG. 1;

FIG. 3A is a view for explaining the quantity of light which reaches a driver's view point I from the warning display unit 16 when a front glass 18 is subjected to the semi-permeable processing by smoking; and FIG. 3B is a view for explaining the quantity of light which reaches a driver's view point I from the warning display unit 16 when the front glass 18 according to this embodiment is equipped with a polarizing plate 19.

DESCRIPTION OF THE PREFERRED EMBODIMENTS

Now referring to the drawings, an explanation will be given of an embodiment of the display apparatus for a vehicle according to this invention. FIG. 1 is a view showing an embodiment of the display apparatus for a vehicle according to this invention.

As seen from FIG. 1, the display apparatus for a vehicle includes a display device 11 incorporated within a dash board 10, a semi-permeable combiner 12 arranged above the dash board 10 to reflect the light emitted from the display device 11 toward the driver's view point I, a polarizing plate 14 incorporated within the dash board 10 and arranged between the display device 11 and the semi-permeable combiner 12, and an analog meter 20 which is arranged on the dash board 10 at the point nearer than the semi-permeable combiner 12 to the driver's view point. Incidentally, reference numeral 21 denotes a handle, reference 22 denotes a bonnet and 23 denotes outdoor light.

In this embodiment, the above display device 11 may be a liquid crystal display equipped with a backlight, which emanates a display light beam indicative of the traveling direction and traveling speed of a navigation device through a liquid crystal cell incorporated therein.

The display light beam emanated from the display device 11 permeates the polarizing plate 14 and passes through the opening of the dash board 10. The light beam is applied on the semi-permeable combiner 12 through which it is guided to the driver's view point I. Thus, the virtual image on the display device 11 is visually recognized from the driver's view point I.

Further, as seen from FIG. 1, the semi-permeable combiner 12 includes a semi-permeable resin 12a subjected to smoking processing, and a polarizing plate 12b (first polarizing plate) which is coated on the inner face of the semi-permeable resin 12a on the side of the driver's view point. The polarizing plate 12b has a polarizing direction different by 90° from the polarizing plate 14 having a polarizing direction of a vehicle height. This semi-permeable resin 12a as well as the polarizing plate 12b permits the semi-permeable combiner 12 to reduce the light passing through itself.

In this way, the light emanated from the display device 11 is polarized in the direction of vehicle width by the polarizing plate 14 and applied onto the semi-permeable combiner 12. The light applied on the semi-permeable combiner 12 cannot pass the polarizing plate 12b in the vehicle height direction because their polarizing directions are different. Therefore, the polarizing plate 12 causes the entire light to be reflected toward the driver's view point I.

On the other hand, the external light applied onto the semi-permeable combiner 12b through the windshield 15 is polarized in the direction of vehicle height by the polarizing plate 12b of the semi-permeable combiner 12, and applied to the polarizing plate 14. The light applied to the polarizing plate 14 cannot permeate the polarizing plate 14 because of the difference in the polarizing direction, and goes toward the display device 11.

A warning display unit 16 (light-emitting display source) is arranged behind the semi-permeable combiner 12. This warning display unit 16 serves to light a symbol mark with no design in a known manner. The warning display unit 16 is incorporated within the dash board 17 and the front glass 18 is arranged at the opening of the dash board 17.

The light-emitting display by the warning display unit 16 can be directly visually recognized from the driver's point I because the emitted light passes through the front glass 18 and semi-permeable combiner 12. As seen from FIG. 2, on the surface of the front glass 18 on the side of the driver's view point, a polarizing plate 19 (second polarizing plate) which has the same polarizing direction as that of the polarizing plate 12b is formed. The polarizing plate 19 is subjected to semi-permeable processing in order to prevent the wash-out in the warning display unit 16.

Referring to FIGS. 3A and 3B, an explanation will be given of the effect of this embodiment in the comparison with the case where the conventional front glass 18 was subjected to the semi-permeable processing by smoking. In FIG. 3, for simplicity of explanation, it is assumed that the warning display unit 16 is emitting the light with the total light intensity of 100 consisting of light intensity of 50 in the vehicle width direction and that of 50 in the vehicle height. In order to make the boundary the semi-permeable resin 12a and the polarizing plate 12b not conspicuous, the attenuation of light by the semi-permeable resin 12a subjected to smoking is neglected.

First, a conventional manner will be explained. As explained in FIG. 3A, the front glass 18 subjected to smoking has a permeability of 40%. The polarizing plate 12b has a permeability of 80% in the vehicle height direction and that of 0% in the vehicle width direction. First, the displaying light emitted from the warning display unit 16 is attenuated to the light intensity of 50×40%=20 in both directions of the vehicle height and the vehicle width.

Next, the light in the vehicle direction is attenuated by the polarizing plate 12b to the light intensity of 20×80% =16 in the vehicle height direction, and that of 0 in the vehicle width direction (because the light in the vehicle width direction cannot permeate the polarizing plate 12b having the polarizing direction of the vehicle height). In short, the light intensity of the light guided to the driver's view point I is 16 of the light intensity of 100 of the light emitted from the warning display unit 16.

This embodiment will be explained below. In this embodiment, as seen from FIG. 3B, the polarizing plate has a permeability of 80% in the vehicle height direction and that of 0% in the vehicle width direction. Therefore, the total permeability of the front glass 18 is 40% as before. Further, the polarizing plate 12b also has a permeability of 80% in the vehicle height direction and that of 0% in the vehicle width direction as before.

The display light emitted from the warning display unit 16 is attenuated by the front glass 18 equipped with the polarizing plate 19 to the light intensity of 50×80%=40 in the vehicle height direction, and that of 0 in the vehicle width direction (because the light in the vehicle width direction cannot permeate the polarizing plate 12b having the polarizing direction of the vehicle height). In short, the light intensity of the light guided to the driver's view point I is 40 of the light intensity of 100, i.e. 40% of the light emitted from the warning display unit 16.

The light in the vehicle width direction is attenuated to the light with the light intensity of 40×80%=32% by the polarizing plate 12b of the semi-permeable combiner 12. In short, the light guided to the driver's view point I is 32 of the light intensity of 100 of the light emitted from the warning display unit 16.

As understood from the description hitherto made, by providing the front glass 19 with the polarizing plate 19 having the same polarizing direction as that of the polarizing plate 12b, the amount of light guided to the driver's view point I can be increased as compared with the case where the front glass 18 subjected to smoking has the same permeability of 40% as that of the front glass 18 equipped with the polarizing plate 19.

In accordance with the invention, the second polarizing plate having the same polarizing direction as that of the first polarizing plate which constitutes the semi-permeable combiner is formed on the surface of the front glass. Therefore, the amount of light emitted from the light-emitting source and guided to the driver's view point can be increased as compared with the case where the front glass subjected to smoking is given to have the permeability equal to that of the front glass provided with the second polarizing plate. In this configuration, the wash-out in the warning display unit, i.e. a light emitting source, arranged behind the combiner can be prevented and visual recognition of the light emitting source can be improved.

Incidentally, the contents of Japanese Patent Appln. No. 02-259827 filed on Sep. 5, 2002 are hereby incorporated by reference.

What is claimed is:

1. A display apparatus for a vehicle comprising:
    a light emitting source for emitting light;
    a dash board which incorporates said light emitting source;
    a front glass formed at an opening of said dash board;
    a semi-permeable combiner having a first polarizing plate, the light emitted from said light emitting source being guided to a view point of a driver through said front glass and said first polarizing plate; and
    a second polarizing plate formed on a surface of said front glass and having the same polarizing direction as that of said first polarizing plate.

2. A display apparatus for a vehicle according to claim 1, wherein said semi-permeable combiner includes a semi-permeable resin.

* * * * *